Jan. 21, 1958
F. E. GARRIOTT
2,820,726
ALUMINUM BRONZE WELD ROD
Filed Feb. 3, 1955
FIG. I.
FIG. 2.
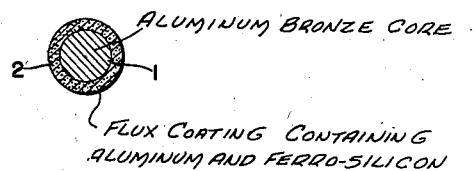
ALUMINUM BRONZE CORE
FLUX COATING CONTAINING
ALUMINUM AND FERRO-SILICON
INVENTOR.
FRANCIS E. GARRIOTT
BY
Attorneys

United States Patent Office 2,820,726
Patented Jan. 21, 1958

2,820,726
ALUMINUM BRONZE WELD ROD

Francis E. Garriott, Milwaukee, Wis., assignor to Ampco Metal, Inc., Milwaukee, Wis., a corporation of Wisconsin Application February 3, 1955, Serial No. 485,977

8 Claims. (Cl. 117—207)

This invention relates to an aluminum bronze weld rod and more particularly to an aluminum bronze weld rod having hardening metals in the flux coating to produce a weld deposit having high hardness and tensile strength.

Commercial aluminum bronze weld rods generally consist of two parts, a central aluminum bronze alloy core rod and a covering containing arc stabilizing, fluxing, reducing and binding materials. Core rods and filter rods of aluminum bronze alloys producing deposits of high hardness cannot generally be cold drawn to size because of the brittle nature of the alloys and thus are extruded oversize and hot swaged to the desired diameter. Not only is swaging a slow, expensive process but limitations are encountered whereby aluminum bronze alloys having an aluminum content of approximately 14.5%, corresponding to a hardness of about 320 Brinell, cannot be formed by extrusion and hot swaging but instead have to be made by sand casting which is impractical for production purposes.

This invention is based on the concept that an extremely hard, high strength aluminum bronze weld deposit can be obtained by use of a weld rod or filler rod composed of a cold drawable aluminum bronze core wire or an aluminum-iron-copper core wire covered with a flux coating containing aluminum in combination with ferro-silicon. These metals in the coating give the resulting weld metal the particular higher hardness and tensile strength required.

According to the invention, the aluminum and ferro-silicon are present in the flux coating in an amount from 11 to 51% by weight of the coating and generally in an amount from 0.5 to 15% by weight of the core.

The aluminum and ferro-silicon alloy with the aluminum bronze core during welding to provide a weld deposit having substantially greater hardness and tensile strength than that of the core and having excellent appearance and quality for joining and overlaying metal objects.

The drawings illustrate the best mode contemplated of carrying out the invention.

In the drawings:

Figure 1 is a plan view of the weld rod of the present invention; and

Fig. 2 is a transverse section taken through the weld rod.

Referring to the drawings there is shown a weld rod or electrode comprising a metal core 1 and an outer coating 2.

The core 1 is formed of an extruded or rolled aluminum bronze alloy having the following compositional range:

| | Percent |
|---|---|
| Aluminum | 6–15 |
| Copper | Balance |

Another general example of an aluminum bronze alloy containing iron which is used as the core 1 is as follows:

| | Percent |
|---|---|
| Aluminum | 6–15 |
| Iron | .01–5 |
| Copper | Balance |

More specifically, the following aluminum bronze alloys have been employed as the core 1:

| | Weight percent | | | | |
|---|---|---|---|---|---|
| Copper | 92.0 | 89.58 | 84.60 | 83.11 | 80.41 |
| Aluminum | 7.5 | 9.55 | 11.51 | 12.48 | 14.69 |
| Iron | | 0.79 | 3.64 | 4.02 | 4.47 |
| Nickel | | 0.06 | 0.22 | 0.38 | 0.40 |
| Silicon | Trace | Trace | Trace | 0.01 | 0.01 |
| Manganese | | 0.01 | 0.01 | 0.01 | 0.01 |
| Others | [1] 0.50 | [1] 0.50 | [1] 0.50 | [1] 0.50 | [1] 0.50 |

[1] Maximum.

The coating 2 provides a reducing atmosphere and a molten slag blanket to prevent excessive oxidation of the weld metal during transfer across the arc and in the molten puddle during the melting operation.

The coating 2 generally consists of fluxing materials, arc stabilizing materials, reducing materials, and a binder.

The coating 2 may be applied to the core wire 1 by dipping, extruding, applying, or by any of the usual processes by which coatings are normally applied to the core.

The fluxing agents in the coating consists of alkali and alkaline earth metal fluorides such as sodium fluoride, cryolite, barium fluoride, calcium fluoride and the like. The fluxing materials serve to remove the oxides formed in the melting processes from the weld deposit.

Gas shielding and reducing materials such as carbon, alpha flock, wood flour, mordex and the like are employed to provide protection against excessive oxidation of the weld metal.

The binding material in the coating may take the form of sodium or potassium silicate. This material not only serves as a binder, but helps to stabilize the arc, control the surface tension of the slag, and provide additional slag cover protection against oxidation during solidification of the weld metal.

In order to use a relatively ductile core wire of standard composition and yet have a final weld metal composition that has substantially higher hardness and tensile strength, aluminum and ferro-silicon are employed in the coating 2.

The aluminum is employed in the coating in a powdered or finely divided state and serves to alloy with the aluminum bronze of the core to provide a weld deposit of higher hardness and strength.

The ferro-silicon, 50% iron and 50% silicon, employed in the coating 2 also acts to increase the hardness of the weld deposit in addition to serving as a de-oxidizer to prevent oxidation of the weld deposit.

The coating 2 generally has the following composition range by weight:

| | Percent |
|---|---|
| Reducing agents | 5–11 |
| Aluminum | 10–35 |
| Ferro-silicon | 0.1–16 |
| Binder | 5–15 |
| Fluxing agents | Balance |

More specifically, the composition range of the coating by weight is as follows:

| | Percent |
|---|---|
| Cryolite | 15–35 |
| Carbon | 5–11 |
| Alpha flock | .1– 1 |
| Ferro-silicon | 0.1–16 |
| Aluminum | 10–35 |
| Sodium silicate (dry) | 5–15 |
| Sodium fluoride | Balance |

The following specific compositions have been employed as the coating:

|  | Weight percent | | |
|---|---|---|---|
| Sodium fluoride | 30.7 | 18.7 | 25.1 |
| Cryolite | 30.7 | 18.7 | 25.1 |
| Carbon | 10.1 | 6.3 | 8.3 |
| Alpha Flock | 0.8 | 0.8 | 0.7 |
| Ferro-silicon | 2.6 | 15.9 | 10.5 |
| Aluminum | 12.8 | 31.8 | 20.9 |
| Sodium silicate | 12.3 | 7.8 | 10.4 |
|  | 100.0 | 100.0 | 100.0 |

The aluminum and ferro-silicon generally comprise about 11% to 51% by weight of the coating. As the coating generally comprises about 5% to 22% by weight of the core, the aluminum and ferro-silicon are therefore generally equal to about 0.5% to 15% by weight of the core.

Tests have shown that a maximum increase of approximately 1.5% of aluminum in the weld deposit over the aluminum content of the core rod can be obtained by adding powdered aluminum to the coating when using an alpha aluminum-bronze. The alpha aluminum-bronze contains about 5% to 11% aluminum. With an increase of 1.5% in the aluminum content and an increase in the iron content of about 1.5% and an increase in the silicon content to about 1.5%, the deposit hardness of an alpha aluminum-bronze is increased about 150 Brinell to a maximum of about 300 Brinell with the metal arc and carbon arc processes. If using inert gas processes, a hardness of about 340 Brinell can be obtained because of the excellent shielding effect of the inert gas.

With a duplex type aluminum-bronze alloy having an aluminum content from about 11% to 13%, the increase in the aluminum content in the deposit can be as high as 2.1%, iron about 1.5% and silicon about 1.5%. This increase of alloying metals produced deposits with a hardness up to 375 Brinell which amounted to an increase of about 175 points Brinell over the hardness of the core rod with the metal and carbon arc processes through the alloy additions to the coating. With the inert gas processes a hardness of 425 Brinell can be obtained.

The same coating compositions when used on a duplex aluminum-bronze alloy having an aluminum content from 13% to 14.5% increased the aluminum content of the deposit 2.3%, iron about 1.5% and silicon about 1.5%. The deposit had a hardness of 450 Brinell which was an increase of 150 points Brinell brought about by the aluminum and ferro-silicon additions to the coating. With an inert gas process a deposit hardness as high as 500 Brinell can be obtained and while a material having a hardness such as this may not prove satisfactory for joining due to the tendencies to crack it can effectively be used as an overlay material.

The present invention which is directed to the use of aluminum and silicon in a flux coating provides a hard high-strength weld deposit which is free of porosity, inclusions, cracks and other defects. By employing a ductile core wire, that can be readily reduced to size in combination with aluminum and ferro-silicon in the coating, it is possible to obtain a weld deposit having a high hardness which could not be practically or economically produced if all of the alloy constituents were to be put in the core rod.

With one standard core rod composition that is ductile enough to be readily reduced to diameter, it is possible to produce a variety of hard alloy deposits through the use of aluminum and ferro-silicon in the coating in varying amounts.

The fluxing, reducing and arc stabilizing ingredients of the coating are provided in the necessary ratio to the aluminum and ferro-silicon to obtain the optimum welding conditions and produce a sound uniform weld.

Various modes of carrying out the invention are contemplated as being within the scope of the following claims particularly pointing out and distinctly claiming the subject matter which is regarded as the invention.

I claim:

1. A weld rod comprising a cold drawable aluminum-bronze alloy core wire and a coating applied to the core and consisting of a fluoride fluxing material, carbonaceous material, a binding material, and an alloying material, said alloying material comprising from 0.5 to 15% by weight of the core and consisting of aluminum and ferro-silicon, said weld rod being characterized by the alloying of aluminum and ferro-silicon of the coating with the core wire during welding to produce a weld deposit having substantially greater hardness and tensile strength than the core wire.

2. A weld rod comprising an aluminum-bronze alloy core wire and a coating applied to the core wire and having the following compositional range by weight:

|  | Percent |
|---|---|
| Aluminum | 10–35 |
| Ferro-silicon | 0.1–16 |
| Carbonaceous material | 5–11 |
| Binding material | 5–15 |
| Fluoride fluxing material | Balance | said weld rod being characterized by the alloying of aluminum and ferro-silicon of the coating with the core wire during welding to produce a weld deposit having substantially greater hardness and tensile strength than the core wire.

3. A weld rod comprising an aluminum-bronze alloy core rod and a coating applied to the core and consisting essentially of from 10 to 35% by weight of aluminum, from 0.1 to 16% by weight of ferro-silicon, from 5 to 11% by weight of carbon, from 0.1 to 1% by weight of alpha flock, from 5 to 15% by weight of an alkali metal silicate, and the balance being a mixture of fluoride fluxing materials selected from the group consisting of sodium fluoride, cryolite, barium fluoride and calcium fluoride, said coating comprising from 5 to 25% by weight of the core, and said weld rod being characterized by said aluminum and ferro-silicon alloying with the core wire during welding to produce a weld deposit having substantially greater hardness and tensile strength than the core wire.

4. A weld rod comprising an aluminum-bronze alloy core wire having substantially the following composition by weight:

|  | Percent |
|---|---|
| Aluminum | 6–15 |
| Copper | Balance | and a coating comprising from 5 to 25% by weight of the core wire and applied to the core wire, said coating having the following composition by weight:

|  | Percent |
|---|---|
| Cryolite | 15–35 |
| Carbon | 5–10 |
| Alpha flock | 1.0–1.0 |
| Ferro-silicon | 0.1–16 |
| Aluminum | 10–35 |
| Sodium silicate | 5–15 |
| Sodium fluoride | Balance | said weld rod being characterized by said aluminum and ferro-silicon alloying with the core wire during welding to produce a weld deposit having substantially greater hardness and tensile strength than the core wire.

5. A weld rod comprising an aluminum-bronze alloy core wire and a coating applied to the core and consisting of a fluoride fluxing material, carbonaceous material, a binding material, and an alloying material, said alloying material comprising from about 11% to 51% by weight of the coating and from 0.5% to 15% by weight of the core and consisting of aluminum and ferro-silicon, said weld rod being characterized by said aluminum and ferro-silicon alloying with the core wire during welding to produce a weld deposit having substantially greater hardness and tensile strength than the core wire.

6. A weld rod comprising an aluminum-bronze alloy core rod and a coating applied to the core and comprising by weight about 18.7% sodium fluoride, about 18.7% cryolite, about 6.3% carbon, about 0.8% alpha flock, about 15.9% ferro-silicon, about 31.8% aluminum and about 7.8% sodium silicate, said coating comprising from 5 to 25% by weight of the core, and said weld rod being characterized by said aluminum and ferro-silicon alloying with the core wire during welding to produce a weld deposit having substantially greater hardness and tensile strength than the core wire.

7. A weld rod comprising an aluminum-bronze alloy core rod and a coating applied to the core and comprising by weight from 5% to 11% of a carbonaceous material, about 5% to 15% of an alkali metal silicate binding material, about 11% to 51% of a metallic material consisting of the combination of aluminum and ferro-silicon and the balance being a mixture of fluoride fluxing materials selected from the group consisting of sodium fluoride, cryolite, barium fluoride and calcium fluoride, said coating comprising from 5% to 25% by weight of the core, and said weld rod being characterized by said aluminum and ferro-silicon alloying with the core wire during welding to produce a weld deposit having substantially greater hardness and tensile strength than the core wire.

8. A weld rod comprising an aluminum-bronze alloy core wire having the following composition by weight:

| | Percent |
|---|---|
| Aluminum | 6–15 |
| Iron | 0.01–5 |
| Copper | Balance | and a coating comprising from 5% to 25% by weight of the core wire and applied to the core wire, said coating comprising by weight from 5% to 11% of a carbonaceous material, about 5% to 15% of an alkali metal silicate binding material, about 11% to 51% of a metallic material consisting of the combination of aluminum and ferro-silicon and the balance being a mixture of fluoride fluxing materials selected from the group consisting of sodium fluoride, cryolite, barium fluoride and calcium fluoride, said coating comprising from 5% to 25% by weight of the core, and said weld rod being characterized by said aluminum and ferro-silicon alloying with the core wire during welding to produce a weld deposit having substantially greater hardness and tensile strength than the core wire.

References Cited in the file of this patent
UNITED STATES PATENTS

| | | |
|---|---|---|
| 1,946,958 | Anastasiadis | Feb. 13, 1934 |
| 1,977,278 | Judy | Oct. 16, 1934 |
| 2,009,240 | Roberts et al. | July 23, 1935 |
| 2,238,392 | Matush | Apr. 15, 1941 |
| 2,320,676 | Swift | June 1, 1943 |
| 2,456,609 | Andrews | Dec. 21, 1948 |
| 2,544,000 | Wasserman | Mar. 6, 1951 |
| 2,552,105 | Miller et al. | May 8, 1951 |
| 2,632,080 | Wasserman | Mar. 17, 1953 |

U. S. DEPARTMENT OF COMMERCE
PATENT OFFICE

CERTIFICATE OF CORRECTION

Patent No. 2,820,726                                                January 21, 1958

Francis E. Garriott

It is hereby certified that error appears in the printed specification of the above numbered patent requiring correction and that the said Letters Patent should read as corrected below.

Column 1, line 19, for "filter" read -- filler --; column 4, line 58, for

"Alpha flock-------1.0-1.0"

read

-- Alpha flock-------0.1-1.0 --.

Signed and sealed this 25th day of March 1958.

(SEAL)
Attest:
KARL H. AXLINE                                           ROBERT C. WATSON
Attesting Officer                                      Commissioner of Patents